(12) United States Patent
Chen et al.

(10) Patent No.: US 12,035,646 B2
(45) Date of Patent: Jul. 16, 2024

(54) INTEGRATED TRANSPORT COUPLING SYSTEM

(71) Applicant: DEERE & COMPANY, Moline, IL (US)

(72) Inventors: Jixin Chen, Moline, IL (US); Michael W. Mossman, Silvis, IL (US); Michael L. Vandeven, Le Claire, IA (US); Duane M. Bomleny, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 796 days.

(21) Appl. No.: 17/119,852

(22) Filed: Dec. 11, 2020

(65) Prior Publication Data

US 2022/0183202 A1 Jun. 16, 2022

(51) Int. Cl.
*A01B 59/06* (2006.01)
*A01B 59/00* (2006.01)
(Continued)

(52) U.S. Cl.
CPC .......... *A01B 59/064* (2013.01); *A01B 59/006* (2013.01); *A01B 73/005* (2013.01);
(Continued)

(58) Field of Classification Search
CPC ... A01B 59/064; A01B 59/006; A01B 73/005; A01B 73/00; A01B 1/00; A01D 57/28; A01D 75/002; A01D 75/004; B60D 1/145
See application file for complete search history.

(56) References Cited

U.S. PATENT DOCUMENTS 4,418,518 A * 12/1983 Koch ............... A01B 73/00
  172/679
4,460,193 A * 7/1984 Dietz ............... A01D 67/005
  172/383

(Continued)

FOREIGN PATENT DOCUMENTS

DE  2132135 A1 * 2/1972 ........... A01B 73/005
EP  3395156 A1 * 10/2018 ............ A01B 73/00
(Continued)

OTHER PUBLICATIONS

600D Series Draper Platforms (S.N. 755001-) Operator's Manual, John Deere Harvester Works, Deere & Company; document copyright dated in 2012; 29 pages.

*Primary Examiner* — Arpad Fabian-Kovacs
(74) *Attorney, Agent, or Firm* — Taft Stettinius & Hollister LLP; Stephen F. Rost (57) ABSTRACT

A transport assembly for a harvesting head that includes head connector arms, a transport axle, and a coupling system with a latch actuator, and first and second latch mechanisms coupled to the latch actuator and located at opposite ends of the transport axle. The transport assembly functions in working and transport modes. In the working mode, the first and second latch mechanisms latch the first and second head connector arms to the transport axle to latch the harvesting head to the transport axle. When the latch actuator is activated, the first and second latch mechanisms release the first and second head connector arms from the transport axle to allow the harvesting head to separate from the transport axle. When the latch actuator is not activated, the first and second latch mechanisms can be biased to remain latched.

20 Claims, 7 Drawing Sheets

(51) Int. Cl.
*A01B 73/00* (2006.01)
*A01D 57/28* (2006.01)
*A01D 75/00* (2006.01)
*B60D 1/145* (2006.01)

(52) U.S. Cl.
CPC .............. *A01B 73/00* (2013.01); *A01D 57/28* (2013.01); *A01D 75/002* (2013.01); *A01D 75/004* (2013.01); *B60D 1/145* (2013.01)

(56) References Cited

U.S. PATENT DOCUMENTS

| | | | | |
|---|---|---|---|---|
| 4,682,462 | A * | 7/1987 | Johnson, Sr. | A01B 73/005 172/383 |
| 4,934,131 | A * | 6/1990 | Frisk | A01B 73/005 56/192 |
| 6,209,297 | B1 * | 4/2001 | Yeomans | A01B 73/005 56/228 |
| 6,260,629 | B1 * | 7/2001 | Toth | A01B 73/005 172/278 |
| 6,273,449 | B1 * | 8/2001 | Harkcom | B60D 1/145 280/491.3 |
| 6,360,516 | B1 * | 3/2002 | Harkcom | A01D 67/005 56/15.5 |
| 6,907,719 | B2 * | 6/2005 | Ligouy | A01B 73/005 56/15.1 |
| 7,849,933 | B2 * | 12/2010 | Marggi | A01D 78/146 172/311 |
| 7,926,249 | B1 * | 4/2011 | Cook | A01B 73/005 172/240 |
| 8,292,328 | B2 * | 10/2012 | Honas | A01D 75/002 280/789 |
| 9,565,800 | B2 * | 2/2017 | Fay, II | A01D 57/28 |
| 9,596,808 | B2 * | 3/2017 | Fay, II | A01B 73/005 |
| 10,405,481 | B2 | 9/2019 | Chen et al. | |
| 11,124,232 | B2 | 9/2021 | Chen et al. | |
| 11,178,806 | B2 * | 11/2021 | Chen | A01B 73/005 |
| 11,490,564 | B2 * | 11/2022 | LaVally | A01B 73/005 |
| 11,547,034 | B2 * | 1/2023 | Fay, II | A01D 75/004 |
| 11,690,316 | B2 * | 7/2023 | Fay, II | A01B 73/005 56/15.1 |
| 2004/0011538 | A1 * | 1/2004 | Raducha | A01B 73/005 172/311 |
| 2008/0086999 | A1 * | 4/2008 | Tippery | A01D 75/002 56/14.4 |
| 2012/0217723 | A1 * | 8/2012 | Smith | B62D 13/04 56/228 |
| 2013/0284469 | A1 * | 10/2013 | Barnett | A01D 75/06 172/452 |
| 2016/0007534 | A1 * | 1/2016 | Fay, II | A01D 75/004 56/228 |
| 2018/0310462 | A1 | 11/2018 | Chen et al. | |
| 2020/0053949 | A1 | 2/2020 | Chen et al. | |
| 2020/0055545 | A1 | 2/2020 | Chen et al. | |
| 2021/0307247 | A1 * | 10/2021 | Lyons | A01D 75/004 |

FOREIGN PATENT DOCUMENTS

| | | | | |
|---|---|---|---|---|
| EP | | 3861848 A1 * | 8/2021 | ........... A01D 75/002 |
| WO | WO-2013071446 A1 * | | 5/2013 | ............. A01D 43/06 |

* cited by examiner

INTEGRATED TRANSPORT COUPLING SYSTEM

FIELD OF THE DISCLOSURE

This invention relates generally to agricultural harvesters, and more particularly to agricultural harvesting heads.

BACKGROUND

Agricultural harvesters, such as combines, are designed to travel through agricultural fields harvesting crops. Combines receive crop severed from the ground and convey it to threshing, separating and cleaning devices within the combine. In a typical arrangement, the harvesting head severs the crop from the ground and conveys it to the central region of the harvesting head where it is then conveyed rearward into a central and forwardly opening aperture in the front of the combine proper.

Harvesting heads can be quite long, and in order to accurately follow the contours of the ground and sever crop at an appropriate point on the stem, harvesting heads can be made in sections that are generally hinged with respect to each other. To follow the contours of the ground, the harvesting heads include wheels that are mounted on the wing sections of the harvesting head. As these wheels roll across the ground during harvesting they help support the weight of wing sections of the harvesting head. These wheels can also be used in transporting the harvesting head, but it is usually desirable that the wheels be in different configurations when in harvesting mode and when in transport mode. Transitioning the wheels between harvesting and transport modes can be laborious, time consuming and/or require additional equipment.

It would be desirable to provide an agricultural harvesting head with a wheel arrangement that requires less time, effort and equipment to transition the harvesting head and wheel arrangement between harvesting and transport modes.

SUMMARY

A transport assembly for a harvesting head is disclosed that includes first and second head connector arms, an elongated transport axle, and a coupling system. The coupling system includes a latch actuator, a first latch mechanism coupled to the latch actuator and located at a first end of the transport axle, and a second latch mechanism coupled to the latch actuator and located at a second or opposite end of the transport axle. The transport assembly is configured to function in and transition between a working mode and a transport mode. In the working mode, the first latch mechanism latches the first head connector arm to the transport axle and the second latch mechanism latches the second head connector arm to the transport axle in order to latch the harvesting head to the transport axle. When the latch actuator is activated, the first latch mechanism releases the first head connector arm and the second latch mechanism releases the second head connector arm from the transport axle to allow the harvesting head to separate from the transport axle.

The transport assembly can also include a first actuator with a proximal end connected to the first head connector arm and a distal end connected to the harvesting head, and a second actuator with a proximal end connected to the second head connector arm and a distal end connected to the harvesting head. where in the working mode, the first and second actuators cushion the ride of the harvesting head on the transport axle.

The coupling system can also include a bellcrank connected to the latch actuator, a first latch rod with a proximal end connected to the bellcrank and a distal end connected to the first latch mechanism, and a second latch rod with a proximal end connected to the bellcrank and a distal end connected to the second latch mechanism. When the latch actuator is activated, the bellcrank turns to pull the proximal end of the first latch rod away from the first latch mechanism, which pulls the distal end of the first latch rod to cause the first latch mechanism to release the first head connector arm; and the bellcrank simultaneously turns to pull the proximal end of the second latch rod away from the second latch mechanism, which pulls the distal end of the second latch rod to cause the second latch mechanism to release the second head connector arm.

The first latch mechanism can also include a first latch pin connected to the distal end of the first latch rod, where the first latch pin is biased to remain in a latched position. The second latch mechanism can also include a second latch pin connected to the distal end of the second latch rod, where the second latch pin is biased to remain in a latched position. When the latch actuator is activated, the bellcrank turns to pull the proximal end of the first latch rod away from the first latch mechanism, which pulls the distal end of the first latch rod to cause the first latch pin to move from the latched position to release the first head connector arm; and the bellcrank simultaneously turns to pull the proximal end of the second latch rod away from the second latch mechanism, which pulls the distal end of the second latch rod to cause the second latch pin to move from the latched position to release the second head connector arm. The first latch mechanism can include a first spring to bias the first latch pin to remain in the latched position; and the second latch mechanism can include a second spring to bias the second latch pin to remain in the latched position.

The first latch mechanism can also include a first latch guide and a first retractor, where the first latch guide is fixedly attached to the transport axle and the first latch pin is configured to move horizontally through the first latch guide; and where the first retractor attaches the first latch pin to the distal end of the first latch rod. The second latch mechanism can also include a second latch guide and a second retractor, where the second latch guide is fixedly attached to the transport axle and the second latch pin is configured to move horizontally through the second latch guide; and where the second retractor attaches the second latch pin to the distal end of the second latch rod. When the latch actuator is activated, the bellcrank turns to pull the proximal end of the first latch rod away from the first latch mechanism, which pulls the first retractor to cause the first latch pin to move horizontally through the first latch guide to move from the latched position to release the first head connector arm; and the bellcrank simultaneously turns to pull the proximal end of the second latch rod away from the second latch mechanism, which pulls the second retractor to cause the second latch pin to move horizontally through the second latch guide to move from the latched position to release the second head connector arm.

The first latch mechanism can also include a first spring with a proximal end attached to the first retractor and a distal end attached to the first latch guide, such that the first spring biases the first latch pin to remain in the latched position. The second latch mechanism can also include a second spring with a proximal end attached to the second retractor and a distal end attached to the second latch guide such that the second spring biases the second latch pin to remain in the latched position. When the latch actuator is activated, the bellcrank turns to pull the proximal end of the first latch rod away from the first latch mechanism, which pulls the first retractor to stretch the first spring and cause the first latch pin to move horizontally through the first latch guide to move from the latched position to release the first head connector arm; and the bellcrank simultaneously turns to pull the proximal end of the second latch rod away from the second latch mechanism, which pulls the second retractor to stretch the second spring and cause the second latch pin to move horizontally through the second latch guide to move from the latched position to release the second head connector arm. When the latch actuator is no longer activated, the first spring returns to its rest length, which pulls the first retractor back, which causes the first latch pin to move back horizontally through the first latch guide and return to the latched position and causes the distal end of the first latch rod to move towards the first latch mechanism, which pushes the bellcrank and the latch actuator to an inactive position; and the second spring simultaneously returns to its rest length, which pulls the second retractor back, which causes the second latch pin to move back horizontally through the second latch guide and return to the latched position and causes the distal end of the second latch rod to move towards the second latch mechanism, which pushes the bellcrank and the latch actuator to the inactive position.

The first head connector arm can have a first striker plate and the second head connector arm have a second striker plate. The first latch pin can have an upper striker face with a slope that slopes from a higher side nearer the first latch guide to a lower side further from the first latch guide, and the second latch pin can have an upper striker face with a slope that slopes from a higher side nearer the second latch guide to a lower side further from the second latch guide. When the harvesting head is lowered towards the transport axle to transition into working mode; the first striker plate of the first head connector arm lowers onto the upper striker face of the first latch pin and slides down the slope of the upper striker face of the first latch pin, which causes the first latch pin to stretch the first spring and move horizontally through the first latch guide to move from the latched position; and simultaneously the second striker plate of the second head connector arm lowers onto the upper striker face of the second latch pin and slides down the slope of the upper striker face of the second latch pin, which causes the second latch pin to stretch the second spring and to move horizontally through the second latch guide to move from the latched position. When the first striker plate of the first head connector arm lowers below the first latch pin, then the first spring returns to its rest length, which causes the first latch pin to move back through the first latch guide and return to the latched position and latch the first head connector arm to the transport axle. When the second striker plate of the second head connector arm lowers below the second latch pin, then the second spring returns to its rest length, which causes the second latch pin to move back through the second latch guide and return to the latched position and latch the second head connector arm to the transport axle.

The transport assembly can also include a central support with a proximal end connected to the transport axle and a distal end connected to the harvesting head. In the working mode, the central support can lower such that the first and second head connector arms latch to the transport axle; and in transport mode, the central support can raise such that the first and second head connector arms separate from the transport axle. The transport axle can be rotatably connected to the proximal end of the central support; such that in the working mode, the transport axle is generally parallel to the longitudinal axis of the harvesting head; and in transport mode, the transport axle is generally perpendicular to the longitudinal axis of the harvesting head. The transport assembly can also include a side strut with a proximal end connected to the transport axle and a distal end configured to connect to the harvesting head, where in the working mode, the distal end of the side strut is disconnected from the harvesting head and the latched first and second head connector arms keep the transport axle generally parallel to the longitudinal axis of the harvesting head; and in transport mode, the distal end of the side strut is connected to the harvesting head and the side strut keeps the transport axle generally perpendicular to the longitudinal axis of the harvesting head.

The transport assembly can include a central support with a proximal end connected to the transport axle and a distal end connected to a lift assist assembly for the harvesting head, where in the working mode, the central support lowers such that the first and second head connector arms latch to the transport axle; and in the transport mode, the central support and the lift assist assembly raise the harvesting head such that the first and second head connector arms separate from the transport axle.

The first latch mechanism can be biased for the first latch mechanism to remain in the latched position; and the second latch mechanism can be biased for the second latch mechanism to remain in the latched position. The transport assembly can also include a first actuator with a proximal end connected to the first head connector arm and a distal end connected to the harvesting head; and a second actuator with a proximal end connected to the second head connector arm and a distal end connected to the harvesting head. In the working mode, the coupling system can latch the first head connector arm to the transport axle and the second latch mechanism can latch the second head connector arm to the transport axle which couples the first and second actuators between the harvesting head and the transport axle during the working mode. When the latch actuator is activated, the first and second latch mechanisms can release the first and second head connector arms from the transport axle to decouple the first and second actuators from between the harvesting head and the transport axle during transport mode.

The coupling system can also include a bellcrank connected to the latch actuator, a first latch rod with a proximal end connected to the bellcrank and a distal end connected to the first latch mechanism, and a second latch rod with a proximal end connected to the bellcrank and a distal end is connected to the second latch mechanism. When the latch actuator is activated, the bellcrank can turn to simultaneously release the first and second latch mechanisms, and when the latch actuator is not activated, the bellcrank can leave the first and second latch mechanisms in the latched position.

The first latch mechanism can include a first latch pin connected to the distal end of the first latch rod, where the first latch pin is biased to remain in the latched position. The second latch mechanism can include a second latch pin connected to the distal end of the second latch rod, where the second latch pin is biased to remain in the latched position. When the latch actuator is activated, the bellcrank can turn to pull the first latch rod to cause the first latch pin to move from the latched position to release the first latch mechanism, and the bellcrank can simultaneously turn to pull the second latch rod to cause the second latch pin to move from the latched position to release the second latch mechanism.

The first head connector arm can have a first striker plate and the second head connector arm can have a second striker plate. The first latch pin can have an upper striker face with a slope that slopes from a higher side to a lower side, and the second latch pin can have an upper striker face with a slope that slopes from a higher side to a lower side. When the harvesting head is lowered to transition to working mode, the first striker plate of the first head connector arm can lower onto the upper striker face of the first latch pin and slide down the slope of the upper striker face of the first latch pin to cause the first latch pin to move from the latched position; and simultaneously the second striker plate of the second head connector arm can lower onto the upper striker face of the second latch pin and slide down the slope of the upper striker face of the second latch pin to cause the second latch pin to move from the latched position. When the first striker plate of the first head connector arm lowers below the first latch pin, then the first latch pin can return to the latched position and latches the first head connector arm to the transport axle. When the second striker plate of the second head connector arm lowers below the second latch pin, then the second latch pin can return to the latched position and latches the second head connector arm to the transport axle.

The he first latch mechanism can also include a first latch guide and a first retractor, where the first latch guide is fixedly attached to the transport axle and the first latch pin is configured to move horizontally through the first latch guide; and where the first retractor attaches the first latch pin to the distal end of the first latch rod. The second latch mechanism can also include a second latch guide and a second retractor, where the second latch guide is fixedly attached to the transport axle and the second latch pin is configured to move horizontally through the second latch guide; and where the second retractor attaches the second latch pin to the distal end of the second latch rod. When the latch actuator is activated, the bellcrank can turn to pull the first retractor to cause the first latch pin to move horizontally through the first latch guide to release the first latch mechanism, and the bellcrank can simultaneously turn to pull the second retractor to cause the second latch pin to move horizontally through the second latch guide to release the second latch mechanism.

The latch actuator can be manually activated, and the first and second latch mechanisms can be biased to remain in a latched position. When the latch actuator is activated the first and second latch mechanisms can simultaneously move to an unlatched position; and when the latch actuator is not activated the first and second latch mechanisms can remain in a latched position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
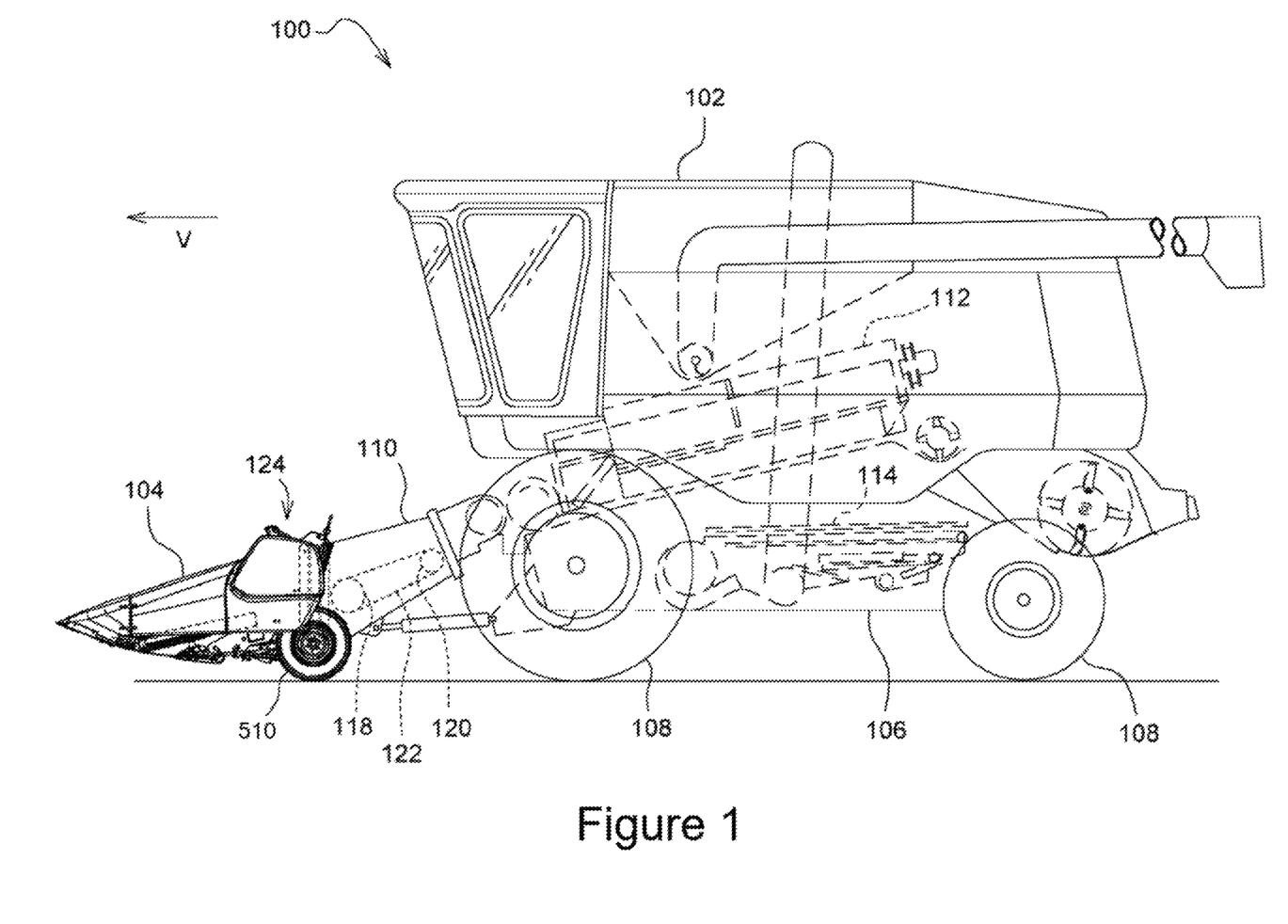
FIG. 1 illustrates a side view of an exemplary agricultural harvester that includes a combine and a harvesting head.
Figure 2:
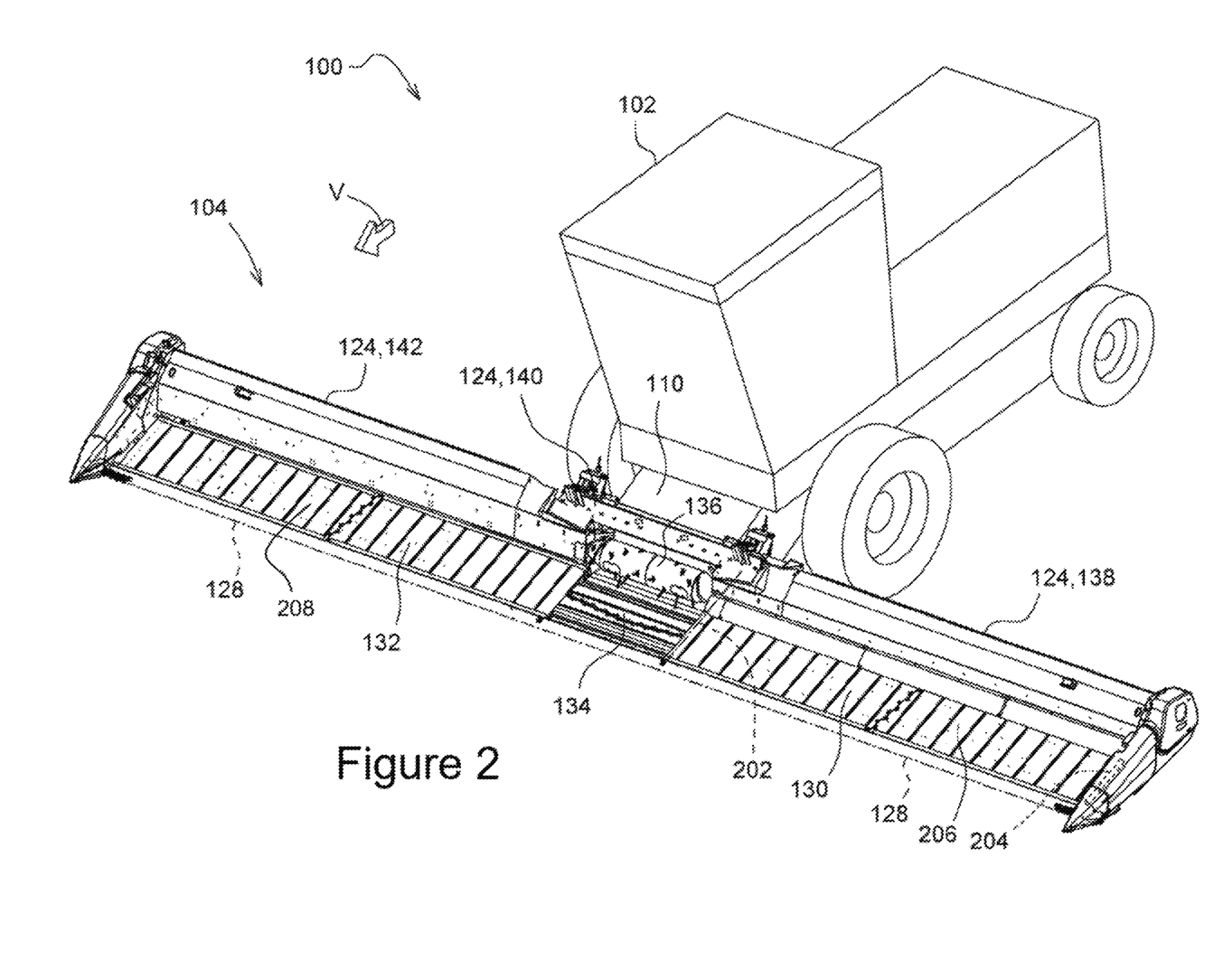
FIG. 2 illustrates a perspective view of the exemplary agricultural harvester.

FIG. 1 illustrates a side view, and FIG. 2 illustrates a perspective view of an agricultural harvester 100 that includes a combine 102 and a harvesting head 104. The combine 102 includes a chassis 106 supported by ground supports 108, as well as a threshing and separating system 112, a cleaning system 114, and a feederhouse 110 that extends forward from the front of the combine 102. The combine 102 also includes a grain storage chamber disposed at the top of the combine 102 that receives grain after it has been threshed, separated, and cleaned. The combine 102 is a self-propelled vehicle which is driven over the ground by a power source such as electric motors or internal combustion engines. The ground supports 108 are preferably wheels or tracks. At least two of the ground supports 108 are driven in rotation by motors to propel the combine 102 over the ground.

The feederhouse 110 is pivotally connected to the front of the combine 102 and extends forward therefrom. The feederhouse 110 can support the harvesting head 104 and include an endless belt conveyor that transports cut grain from the harvesting head 104 to the interior of the combine 102 for processing. The endless belt conveyor of the feederhouse 110 can include a front roller 118 disposed at the front end of the feederhouse 110 and a rear roller 120 disposed at the rear end of the feederhouse 110 where the front and rear rollers 118, 120 support opposing ends of a conveyor belt 122. The movement of the conveyor belt 122 draws the cut grain into the feederhouse 110 and conveys it to the threshing, separating and cleaning systems of the combine 102.

The harvesting head 104 includes a laterally extending main frame 124 that extends perpendicular to a fore-and-aft harvesting direction of travel "V" of the harvester 100 and perpendicular to the longitudinal axis of the combine 102. The harvesting head 104 further includes an elongate cutterbar 128 that extends across almost the entire width of the harvesting head 104. This cutterbar 128 is disposed immediately in front of three cut crop conveyors. These three cut crop conveyors include a left side conveyor 130 that carries cut crop from the left side of the harvesting head 104 to a central region of the harvesting head 104, a right side conveyor 132 that carries crop from the right side of the harvesting head 104 to the central region of the harvesting head 104, and a central conveyor 134 that receives crop from the left and right side conveyors 130, 132, and conveys the cut crop rearward and underneath a drum conveyor 136. Each of these three conveyors 130, 132, 134 is an endless belt conveyor and is disposed immediately behind the cutterbar 128 to receive crop cut by the cutterbar 128.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless left belt 206. Crop material cut by the cutterbar 128 in front of the left frame section 138 falls upon the top surface of the left belt 206 and is drawn toward the center frame section 140. The right side conveyor 132 is supported on the right frame section 142, and also includes a proximal roller adjacent to the center frame section 140 and a distal roller adjacent to the rightmost end of the right frame section 142 to support an endless right belt 208. Crop material cut by the cutterbar 128 in front of the right frame section 142 falls upon the top surface of the right belt 208 and is drawn toward the center frame section 140.

Figure 3:
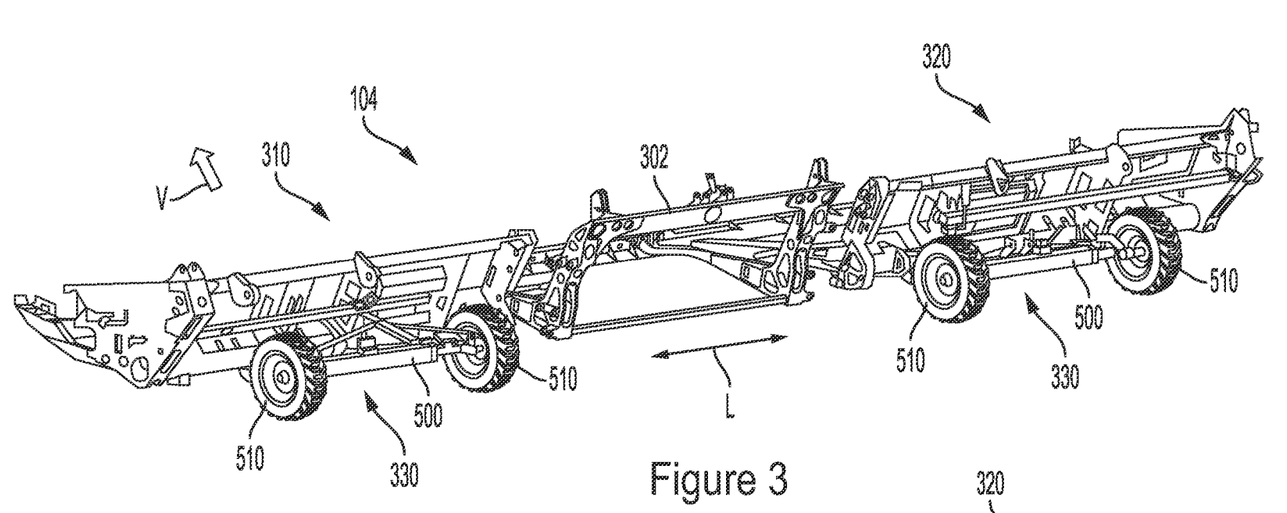
FIG. 3 illustrates an exemplary harvesting head without the combine in harvesting mode with an integrated transport system.
Figure 4:
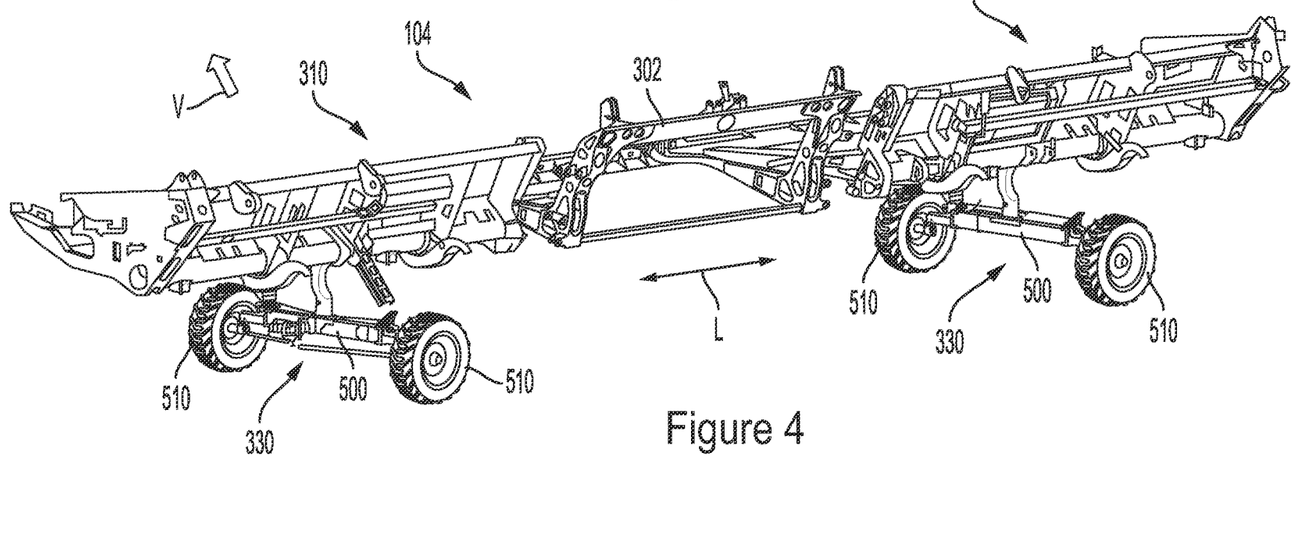
FIG. 4 illustrates the exemplary harvesting head without the combine in transport mode with an integrated transport system.

FIGS. 3 and 4 illustrate rear views of an exemplary harvesting head 104 without the combine 102 to better show the integrated transport system. FIG. 3 illustrates the harvesting head 104 in harvesting mode, and FIG. 4 illustrates the harvesting head 104 in transport mode. The harvesting head 104 includes a center frame 302, a left wing 310 and a right wing 320. The harvesting head 104 includes an integrated transport system that comprises one or more transport assemblies 330 coupled the harvesting head 104. The exemplary embodiment illustrated in FIGS. 3 and 4, shows an integrated transport system that comprises two transport assemblies 330, where a left side transport assembly 330 is coupled to the left wing 310, and a right side transport assembly 330 is coupled to the right wing 320. The center frame 302 couples to the feederhouse 110 of the combine 102. Each of the transport assemblies 330 includes a transport axle 500 and transport ground engaging devices 510 coupled to opposite ends of the transport axle 500. The embodiments shown herein show wheels as the ground engaging devices, but other ground engaging devices can be used, for example tracks. When in harvesting mode (FIG. 3), the transport axle 500 of the transport assembly(s) 330 is generally parallel to the longitudinal axis L of the harvesting head 104, which aligns the transport wheels 510 for travel along the harvesting direction V. When in transport mode (FIG. 4), the transport axle 500 of the transport assembly(s) 330 is generally perpendicular to the longitudinal axis L of the harvesting head 104, which aligns the transport wheels 510 for travel generally perpendicular to the harvesting direction V.

Figure 5:
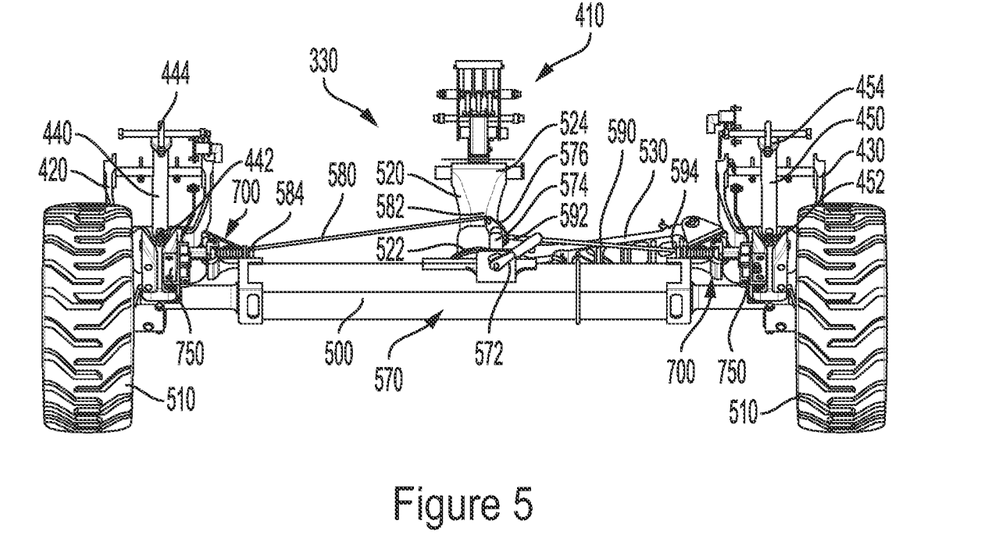
FIG. 5 illustrates a closer rear view of an individual transport assembly in harvesting mode.
Figure 6:
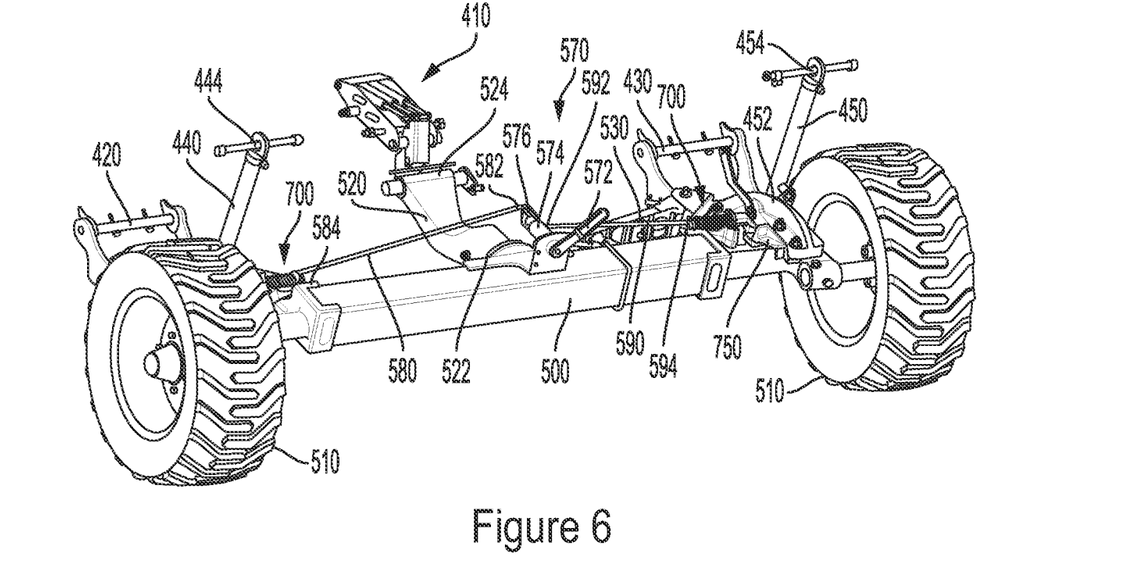
FIG. 6 illustrates a closer perspective view of an individual transport assembly in transport mode.
Figure 7:
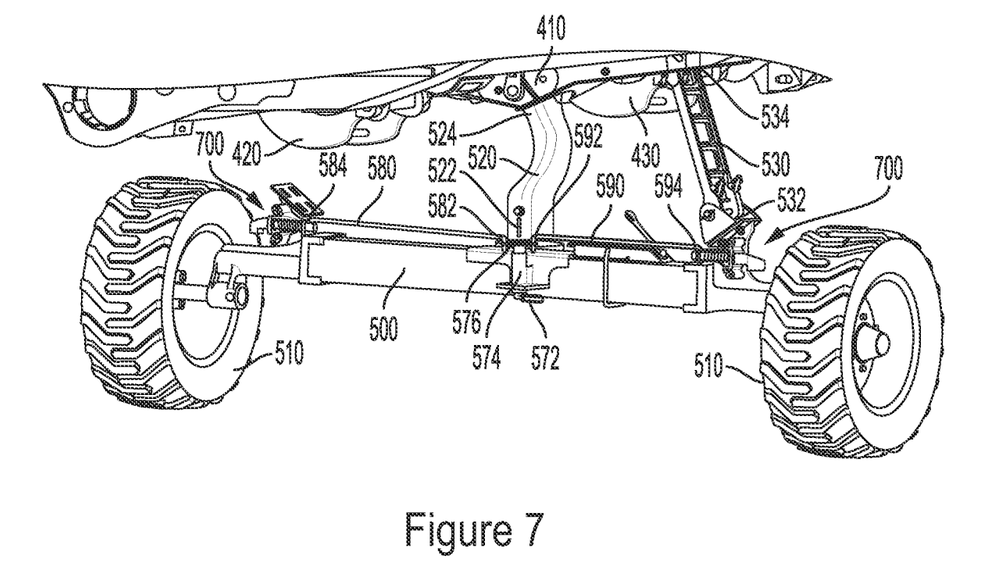
FIG. 7 illustrates a closer perspective view of an individual transport assembly in transport mode.

FIGS. 5 and 6 illustrate closer views of an individual transport assembly 330, which can be used for the left and/or right side transport assemblies 330. FIG. 5 illustrates a rear view of the exemplary transport assembly 330 in harvesting mode, FIG. 6 illustrates a perspective view of the exemplary transport assembly 330 in harvesting mode, and FIG. 7 illustrates a perspective view of the exemplary transport assembly 330 in transport mode. FIGS. 5, 6 and 7 also illustrate an exemplary lift assist connection 410, a left head connector arm 420, a right head connector arm 430, a left actuator 440, and a right actuator 450. The proximal end 442 of the left actuator 440 is connected to the left head connector arm 420, and the proximal end 452 of the right actuator 450 is connected to the right head connector arm 430. The distal ends 444, 454 of the left and right actuators 440, 450 are both connected to the harvester head 104. The actuators 440, 450 can be any of various devices, including for example hydraulic cylinders, springs, linear actuators, jack stands, positioning devices, etc.

The transport assembly 330 includes the transport axle 500 and transport wheels 510, as well as a central support 520, a side strut 530 and a coupling system 570. The transport wheels 510 are coupled to opposite ends of the transport axle 500, and rotate about a rotational axis that extends parallel to the transport axle 500. The central support 520 has a proximal end 522 that couples to the transport axle 500 near the center of the transport axle 500, and a distal end 524 that couples to the lift assist connection 410. The proximal end 522 of the central support 520 allows the transport axle 500 to rotate relative to the central support 520 during transitions between harvesting and transport modes. The side strut 530 has a proximal end that couples to the transport axle 500 between the center of the transport axle 500 and one of the transport wheels 510, and a distal end 524 that is configured to couple to the harvesting head 104 when the harvesting head 104 is in transport mode. Each of the left and right head connector arms 420, 430 is configured to attach to the transport axle 500 when the harvesting head 104 is in harvesting mode. The left and right actuators 440, 450 that are connected to the head connector arms 420, 430 can help cushion the ride of the harvesting head 104 on the transport axle 500 when the head connector arms 420, 430 are latched to the transport axle 500 in harvesting mode.

Figure 8:
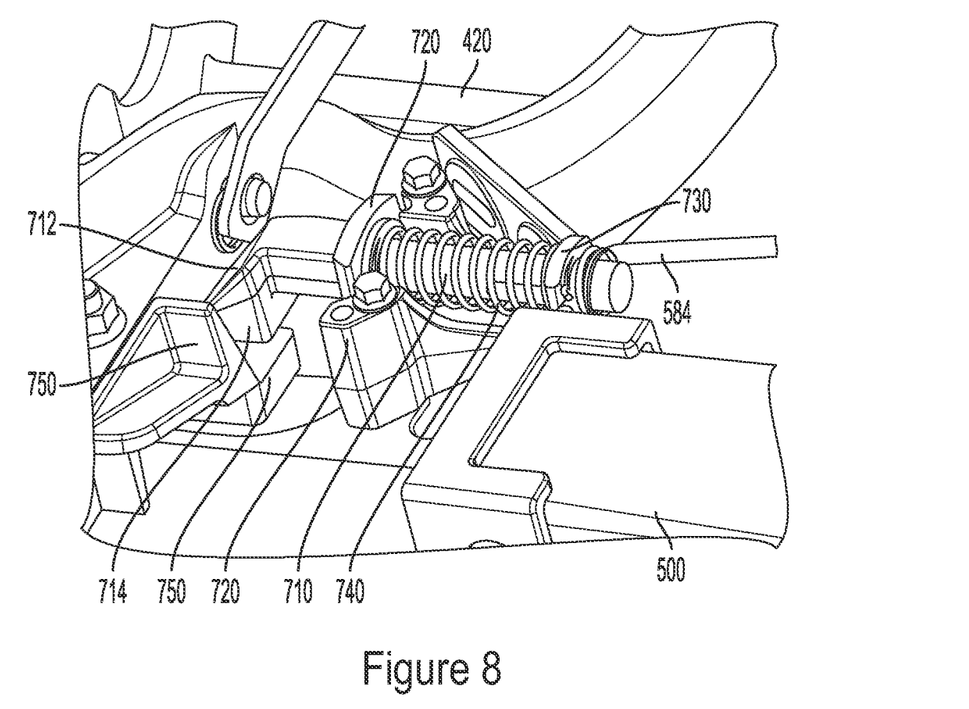
FIG. 8 illustrates an exemplary latch mechanism coupled to the distal end of the left latch rod.
Figure 9:
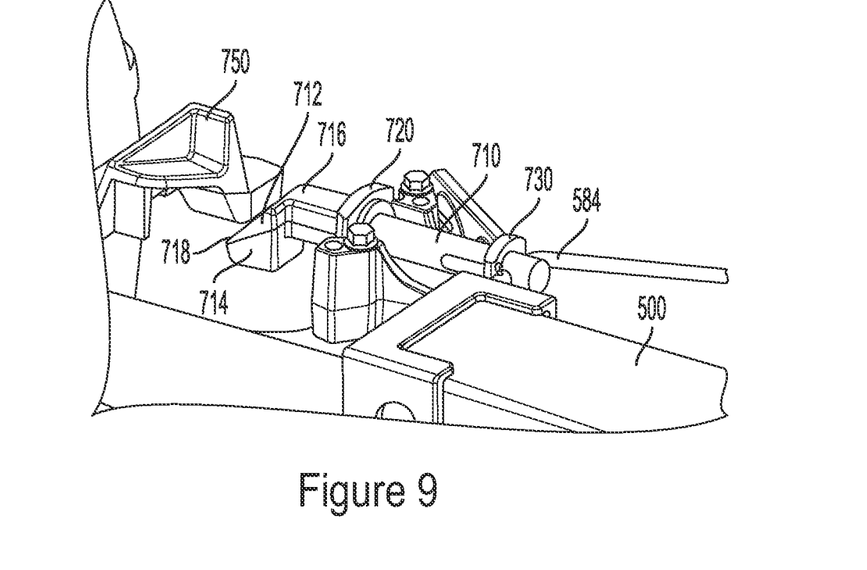
FIG. 9 illustrates unlatching of the exemplary latch mechanism at the distal end of the left latch rod.
Figure 10:
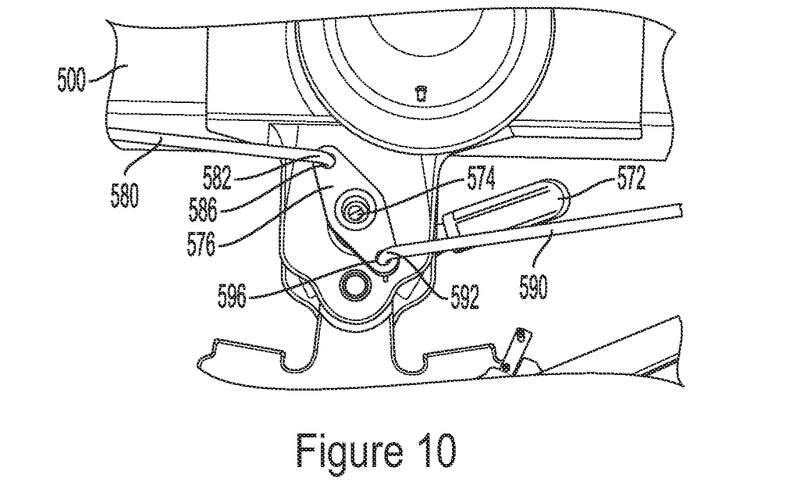
FIG. 10 illustrates an exemplary coupling system in an unactuated position.
Figure 11:
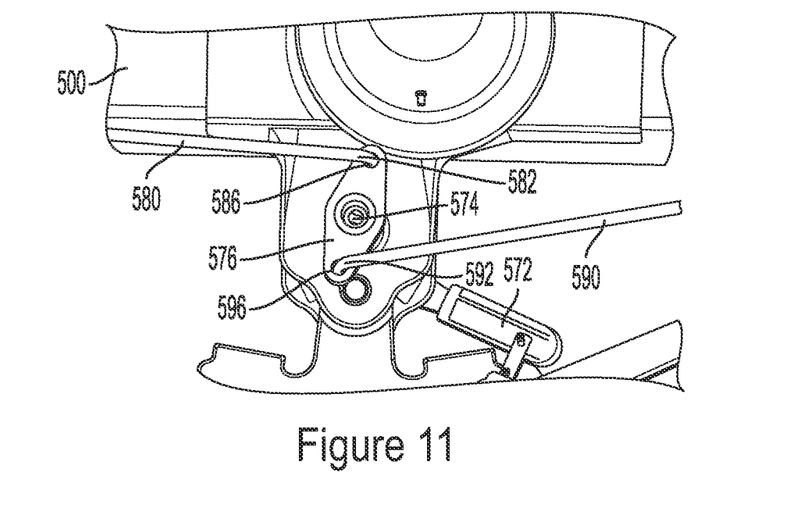
FIG. 11 illustrates the exemplary coupling system in an actuated position.

FIGS. 10 and 11 illustrate the central portion of an exemplary coupling system 570, where FIG. 10 illustrates the coupling system 570 in an unactuated position and FIG. 11 illustrates the coupling system 570 in an actuated position. The exemplary coupling system 570 includes a latch actuator 572, a bellcrank post 574, a bellcrank 576, a left latch rod 580, and a right latch rod 590. FIGS. 8 and 9 illustrate closer views of the central portion of the exemplary coupling system 570, where FIG. 9 illustrates the coupling system 570 unactuated and FIG. 10 illustrates the coupling system 570 actuated. The bellcrank post 574 is coupled to the transport axle 500 such that the bellcrank post 574 can rotate or turn relative to the transport axle 500. The latch actuator 572 and the bellcrank 576 are coupled to the bellcrank post 574 such that the latch actuator 572 can be rotated or turned to turn the bellcrank 576. The left latch rod 580 has a proximal end 582 that is coupled to the bellcrank 576 at a left bellcrank connection 586, and a distal end 584 that is coupled to a left latch mechanism 700. The right latch rod 590 has a proximal end 592 that is coupled to the bellcrank 576 at a right bellcrank connection 596, and a distal end 594 that is coupled to a right latch mechanism 700.

FIG. 7 illustrates an exemplary latch mechanism 700 coupled to the distal end 584 of the left latch rod 580. FIG. 8 illustrates unlatching of the exemplary latch mechanism 700 at the distal end 584 of the left latch rod 580. The same type of latch mechanism 700 can also be coupled to the distal end 594 of the right latch rod 590. The latch mechanism 700 includes a latch pin 710, a latch guide 720, a retractor 730 and a spring 740. The latch pin 710 includes an upper striker face 712 and a lower locking face 714. The upper striker face 712 is sloped from a high side 716 nearer the latch guide 720 and a lower side 718 further from the latch guide 720 so that weight lowered onto the upper striker face 712 slides or pushes the latch pin 710 horizontally inward which allows the weight to continue lowering. The lower locking face 714 is flat so weight against the lower locking face 714 does not horizontally push the latch pin 710. The spring 740 is positioned around the latch pin 710 between the latch guide 720 and the retractor 730 and is attached to both the latch guide 720 and the retractor 730. The latch pin 710 can move generally horizontally through the latch guide 720, and the latch guide 720 is fixedly attached to the transport axle 500. The spring 740 is configured to pull the retractor 730 towards the latch guide 720 which biases the latch pin 710 to extend through the latch guide 720, which pushes the lower locking face 714 of the latch pin 710 away from the latch guide 720 and puts the latching mechanism 700 in a latched position. The retractor 730 is connected to the latch pin 710, and is connected to the distal end 584 of the left latch rod 580. The latch actuator 572 can be activated/turned to turn the bellcrank 576, which pulls the left latch rod 580 away from the left transport wheel 510, which pulls the distal end 584 of the left latch rod 580 away from the latch guide 720, which pulls the latch pin 710 through the latch guide 720, which pulls the lower locking face 714 of the latch pin 710 towards the latch guide 720 and puts the latching mechanism 700 in a release position.

A striker plate 750 is coupled to the left head connector arm 420 of the harvesting head 104, and a striker plate 750 is coupled to the right head connector arm 430 of the harvesting head 104. When the harvesting head 104 is lowered onto the transport assembly 330, the striker plates 750 of the left and right head connector arms 420, 430 of the harvesting head 104 lower onto the upper striker faces 712 of the latch pins 710, which push the latch pins 710 of the left and right latch mechanisms 700 horizontally inward towards their respective latch guides 720, which allows the harvesting head 104 to continue lowering. When the striker plates 750 of the left and right head connector arms 420 lower past the latch pins 710, the latch pins 710 re-extend back through their respective latch guides 720, and the lower locking faces 714 of the latch pins 710 of the left and right latch mechanisms 700 lock the striker plates 750 of the left and right head connector arms 420, 430 under the latch pins 710. This locks the left and right head connector arms 420, 430 of the harvesting head 104 in the left and right locking mechanisms 700 of the transport assembly 330, which prevents the harvesting head 104 from separating from the transport axle 500 of the transport assembly 330. This also couples the left and right actuators 440, 450 between the harvesting head 104 on the transport axle 500 which helps cushion the ride of the harvesting head 104 on the transport axle 500.

The latch actuator 572 can be turned to turn the bellcrank 574 which pulls the distal end 584 of the left latch rod 580 away from the left transport wheel 510 and pulls the distal end 594 of the right latch rod 590 away from the right transport wheel 510 of the transport assembly 330. This pulling of the distal ends 584, 594 of the left and right latch rods 580, 590 inward (away from the left and right transport wheels 510), pulls the locking faces 714 of the latch pins 710 off the striker plates 750 of the left and right head connector arms 420, 430. This unlocks/releases the left and right head connector arms 420, 430 of the harvesting head 104 from the left and right locking mechanisms 700 of the transport assembly 330, which allows the harvesting head 104 to separate and raise from the transport axle 500 of the transport assembly 330. This also decouples the left and right actuators 440, 450 between the harvesting head 104 on the transport axle 500.

When in harvesting mode (FIG. 3), the transport axle 500 of the transport assembly 330 is generally parallel to the longitudinal axis L of the harvesting head 104, which aligns the transport wheels 510 of the transport assembly 330 for travel along the harvesting direction V. In harvesting mode, the central support 520 and the side strut 530 of the transport assembly 330 are lowered which lowers the harvesting head 104 near the transport axle 500. As described above, the lowering of the harvesting head 104 latches the left and right head connector arms 420, 430 of the harvesting head 104 in the left and right locking mechanisms 700 of the transport assembly 330, which prevents the harvesting head 104 from separating from the transport axle 500 of the transport assembly 330. The left and right actuators 440, 450 connected to the left and right head connector arms 420, 430 are also connected to the transport axle 500 to help cushion the ride of the harvesting head 104 on the transport axle 500 during harvesting operations.

When in transport mode (FIG. 4), the transport axle 500 of the transport assembly 330 is generally perpendicular to the longitudinal axis L of the harvesting head 104, which aligns the transport wheels 510 of the transport assembly 330 perpendicular to travel along the harvesting direction V. In transport mode, the central support 520 of the transport assembly 330 is raised which lifts the harvesting head 104 away from the transport axle 500 of the transport assembly 330, which also disconnects the left and right actuators 440, 450 connected to the left and right head connector arms 420, 430 from the transport axle 500. In transport mode, the distal end of the side strut 530 can be attached to the harvesting head 104, such that the side strut 530 (with its proximal end attached to the transport axle 500 and its distal end attached to the harvesting head 104) can prevent the transport axle 500 from rotating on the proximal end 522 of the central support 520 while in transport mode.

The transport assembly 330 provides an easy to use mechanism that decouples and couples the left and right head connector arms 420, 430 and the left and right actuators 440, 450 during transitions between harvesting and transport modes.

The single latch actuator 572 of the coupling system 570 can be activated/turned to go from harvesting mode to transport mode. The coupling system 570 enables decoupling of the left and right head connector arms 420, 430 and automatic decoupling of the left and right actuators 440, 450 in the process of going from harvesting mode to transport mode. The latch actuator 572 can be turned by hand (manual) and/or can be electro-mechanical and can be remotely activated to turn (automatic). Turning the latch actuator 572 turns the bellcrank 576, which pulls the left and right latch rods 580, 590 away from the left and right transport wheels 510, which pulls the distal ends 584, 594 of the left and right latch rods 580, 590 away from the left and right transport wheels 510. This movement of the latch rods 580, 590 away from the left and right transport wheels 510 pulls the left and right latch pins 710 through their respective latch guides 720, which puts the left and right latching mechanisms 700 in the release position. This releases the striker plates 750 of the left and right head connector arms 420, 430 of the harvesting head 104 from the left and right latching mechanisms 700, which decouples the left and right head connector arms 420, 430 and the left and right actuators 440, 450 from the transport axle 500, and allows the harvesting head 104 to be lifted away from the transport axle 500 of the transport assembly 330, and allows the harvesting head 104 to transition to transport mode. A lift assist assembly connected at the lift assist connection 410 can help in lifting the harvesting head 104. While the harvesting head 104 is being lifted, the transport axle 500 can be turned 90 degrees from being generally parallel to the longitudinal axis L of the harvesting head 104 to being generally perpendicular to the longitudinal axis L of the harvesting head 104. The distal end of the side strut 530 can then be attached to the lifted harvesting head 104 to prevent the transport axle 500 from rotating while it is in transport mode.

The coupling system 570 also enables coupling of the left and right head connector arms 420, 430 and automatic coupling of the left and right actuators 440, 450 in the process of going from transport mode to harvesting mode. When going from transport mode to harvesting mode, the harvesting head 104 lowers onto the transport axle 500 of the transport assembly 330. The distal end of the side strut 530 can be disconnected from the harvesting head 104 to allow the transport axle 500 to rotate. While the harvesting head 104 is being lowered, the transport axle 500 can be turned 90 degrees from being generally perpendicular to the longitudinal axis L of the harvesting head 104 to being generally parallel to the longitudinal axis L of the harvesting head 104. As the harvesting head 104 lowers, the striker plates 750 of the left and right head connector arms 420, 430 of the harvesting head 104 lower onto the upper striker faces 712 of the latch pins 710 which push the latch pins 710 of the left and right latch mechanisms 700 horizontally inward towards their respective latch guides 720 to allow the harvesting head 104 to continue lowering until the striker plates 750 lower below the latch pins 710. When the striker plates 750 of the left and right head connector arms 420, 430 lower below the latch pins 710, the springs 740 of the left and right latch mechanisms 700 re-extend the latch pins through their respective latch guides 720, which pushes the lower locking faces 714 of the latch pins 710 over the striker plates 750 of the left and right head connector arms 420, 430, which couples the left and right head connector arms 420, 430 of the harvesting head 104 in the left and right latch mechanisms 700 of the transport assembly 330. Coupling the left and right head connector arms 420, 430 in the left and right latch mechanisms 700 also automatically couples the left and right actuators 440, 450 between the harvesting head 104 and the transport axle 500. The lower locking faces 714 of the latch pins 710 prevent the left and right head connector arms 420, 430 of the harvesting head 104 from separating from the transport axle 500 of the transport assembly 330 and keep the transport assembly 330 in the harvesting mode.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:
1. A transport assembly for a harvesting head, the transport assembly comprising:
a first head connector arm;
a second head connector arm;
an elongated transport axle having a first end and a second end, the second end being opposite from the first end; and
a coupling system comprising:
a latch actuator;
a first latch mechanism coupled to the latch actuator and located at the first end of the transport axle;
a second latch mechanism coupled to the latch actuator and located at the second end of the transport axle;
wherein the transport assembly is configured to function in and transition between a working mode and a transport mode;
wherein in the working mode, the first latch mechanism latches the first head connector arm to the transport axle and the second latch mechanism latches the second head connector arm to the transport axle to latch the harvesting head to the transport axle; and
wherein when the latch actuator is activated, the first latch mechanism releases the first head connector arm and the second latch mechanism releases the second head connector arm from the transport axle to allow the harvesting head to separate from the transport axle.

2. The transport assembly of claim 1, further comprising:
a first actuator with a proximal end and a distal end, where the proximal end is connected to the first head connector arm and the distal end is connected to the harvesting head;
a second actuator with a proximal end and a distal end, where the proximal end is connected to the second head connector arm and the distal end is connected to the harvesting head;
wherein in the working mode, the first and second actuators cushion the ride of the harvesting head on the transport axle.

3. The transport assembly of claim 2, wherein the coupling system further comprises:
a bellcrank connected to the latch actuator;
a first latch rod with a proximal end and a distal end, where the proximal end is connected to the bellcrank and the distal end is connected to the first latch mechanism;
a second latch rod with a proximal end and a distal end, where the proximal end is connected to the bellcrank and the distal end is connected to the second latch mechanism;
wherein when the latch actuator is activated, the bellcrank turns to pull the proximal end of the first latch rod away from the first latch mechanism which pulls the distal end of the first latch rod to cause the first latch mechanism to release the first head connector arm, and the bellcrank simultaneously turns to pull the proximal end of the second latch rod away from the second latch mechanism which pulls the distal end of the second latch rod to cause the second latch mechanism to release the second head connector arm.

4. The transport assembly of claim 3,
wherein the first latch mechanism comprises a first latch pin connected to the distal end of the first latch rod, where the first latch pin is biased to remain in a latched position;

the second latch mechanism comprises a second latch pin connected to the distal end of the second latch rod, where the second latch pin is biased to remain in a latched position;
wherein when the latch actuator is activated, the bellcrank turns to pull the proximal end of the first latch rod away from the first latch mechanism which pulls the distal end of the first latch rod to cause the first latch pin to move from the latched position to release the first head connector arm, and the bellcrank simultaneously turns to pull the proximal end of the second latch rod away from the second latch mechanism which pulls the distal end of the second latch rod to cause the second latch pin to move from the latched position to release the second head connector arm.

5. The transport assembly of claim 4, wherein the first latch mechanism further comprises a first spring configured to bias the first latch pin to remain in the latched position; and the second latch mechanism further comprises a second spring configured to bias the second latch pin to remain in the latched position.

6. The transport assembly of claim 4,
wherein the first latch mechanism further comprises a first latch guide and a first retractor, where the first latch guide is fixedly attached to the transport axle and the first latch pin is configured to move horizontally through the first latch guide; and where the first retractor attaches the first latch pin to the distal end of the first latch rod;
wherein the second latch mechanism further comprises a second latch guide and a second retractor, where the second latch guide is fixedly attached to the transport axle and the second latch pin is configured to move horizontally through the second latch guide; and where the second retractor attaches the second latch pin to the distal end of the second latch rod;
wherein when the latch actuator is activated, the bellcrank turns to pull the proximal end of the first latch rod away from the first latch mechanism which pulls the first retractor to cause the first latch pin to move horizontally through the first latch guide to move from the latched position to release the first head connector arm, and the bellcrank simultaneously turns to pull the proximal end of the second latch rod away from the second latch mechanism which pulls the second retractor to cause the second latch pin to move horizontally through the second latch guide to move from the latched position to release the second head connector arm.

7. The transport assembly of claim 6,
wherein the first latch mechanism further comprises a first spring with a proximal end and a distal end, where the proximal end is attached to the first retractor and the distal end is attached to the first latch guide such that the first spring biases the first latch pin to remain in the latched position;
wherein the second latch mechanism further comprises a second spring with a proximal end and a distal end, where the proximal end is attached to the second retractor and the distal end is attached to the second latch guide such that the second spring biases the second latch pin to remain in the latched position;
wherein when the latch actuator is activated, the bellcrank turns to pull the proximal end of the first latch rod away from the first latch mechanism which pulls the first retractor to stretch the first spring and cause the first latch pin to move horizontally through the first latch guide to move from the latched position to release the first head connector arm, and the bellcrank simultaneously turns to pull the proximal end of the second latch rod away from the second latch mechanism which pulls the second retractor to stretch the second spring and cause the second latch pin to move horizontally through the second latch guide to move from the latched position to release the second head connector arm; and
wherein when the latch actuator is no longer activated, the first spring returns to its rest length which pulls the first retractor back which causes the first latch pin to move back horizontally through the first latch guide and return to the latched position and causes the distal end of the first latch rod to move towards the first latch mechanism which pushes the bellcrank and the latch actuator to an inactive position; and the second spring simultaneously returns to its rest length which pulls the second retractor back which causes the second latch pin to move back horizontally through the second latch guide and return to the latched position and causes the distal end of the second latch rod to move towards the second latch mechanism which pushes the bellcrank and the latch actuator to the inactive position.

8. The transport assembly of claim 7, wherein the first head connector arm has a first striker plate and the second head connector arm has a second striker plate;
wherein the first latch pin has an upper striker face with a slope that slopes from a higher side nearer the first latch guide to a lower side further from the first latch guide, and the second latch pin has an upper striker face with a slope that slopes from a higher side nearer the second latch guide to a lower side further from the second latch guide;
wherein, when the harvesting head is lowered towards the transport axle to transition into working mode; the first striker plate of the first head connector arm lowers onto the upper striker face of the first latch pin and slides down the slope of the upper striker face of the first latch pin which causes the first latch pin to stretch the first spring and move horizontally through the first latch guide to move from the latched position, and simultaneously the second striker plate of the second head connector arm lowers onto the upper striker face of the second latch pin and slides down the slope of the upper striker face of the second latch pin which causes the second latch pin to stretch the second spring and to move horizontally through the second latch guide to move from the latched position, and when the first striker plate of the first head connector arm lowers below the first latch pin then the first spring returns to its rest length which causes the first latch pin to move back through the first latch guide and return to the latched position and latch the first head connector arm to the transport axle, and when the second striker plate of the second head connector arm lowers below the second latch pin then the second spring returns to its rest length which causes the second latch pin to move back through the second latch guide and return to the latched position and latch the second head connector arm to the transport axle.

9. The transport assembly of claim 1, further comprising a central support with a proximal end and a distal end, where the proximal end is connected to the transport axle and the distal end is connected to the harvesting head;
wherein in the working mode, the central support lowers such that the first and second head connector arms latch to the transport axle; and in transport mode, the central support raises such that the first and second head connector arms separate from the transport axle.

10. The transport assembly of claim 9, wherein the harvesting head has a longitudinal axis; and the transport axle is rotatably connected to the proximal end of the central support;
   wherein in the working mode, the transport axle is generally parallel to the longitudinal axis of the harvesting head; and in transport mode, the transport axle is generally perpendicular to the longitudinal axis of the harvesting head.

11. The transport assembly of claim 10, further comprising a side strut with a proximal end and a distal end, where the proximal end is connected to the transport axle and the distal end is configured to connect to the harvesting head;
   wherein in the working mode, the distal end of the side strut is disconnected from the harvesting head and the latched first and second head connector arms keep the transport axle generally parallel to the longitudinal axis of the harvesting head; and in transport mode, the distal end of the side strut is connected to the harvesting head and the side strut keeps the transport axle generally perpendicular to the longitudinal axis of the harvesting head.

12. The transport assembly of claim 1, further comprising a central support with a proximal end and a distal end, where the proximal end is connected to the transport axle and the distal end is connected to a lift assist assembly for the harvesting head;
   wherein in the working mode, the central support lowers such that the first and second head connector arms latch to the transport axle; and in the transport mode, the central support and the lift assist assembly raise the harvesting head such that the first and second head connector arms separate from the transport axle.

13. The transport assembly of claim 1, wherein the first latch mechanism further comprises a first spring configured to bias the first latch mechanism to remain in the latched position; and the second latch mechanism further comprises a second spring configured to bias the second latch mechanism to remain in the latched position.

14. The transport assembly of claim 1, wherein when the latch actuator is not activated, the first and second latch mechanisms are biased to remain in a latched position.

15. The transport assembly of claim 14, further comprising:
   a first actuator with a proximal end and a distal end, where the proximal end is connected to the first head connector arm and the distal end is connected to the harvesting head;
   a second actuator with a proximal end and a distal end, where the proximal end is connected to the second head connector arm and the distal end is connected to the harvesting head;
   wherein in the working mode, the coupling system latches the first head connector arm to the transport axle and the second latch mechanism latches the second head connector arm to the transport axle which couples the first and second actuators between the harvesting head and the transport axle during the working mode; and
   wherein when the latch actuator is activated, the first latch mechanism releases the first head connector arm and the second latch mechanism releases the second head connector arm from the transport axle which decouples the first and second actuators from between the harvesting head and the transport axle during transport mode.

16. The transport assembly of claim 15, wherein the coupling system further comprises:
   a bellcrank connected to the latch actuator;
   a first latch rod with a proximal end and a distal end, where the proximal end is connected to the bellcrank and the distal end is connected to the first latch mechanism;
   a second latch rod with a proximal end and a distal end, where the proximal end is connected to the bellcrank and the distal end is connected to the second latch mechanism;
   wherein when the latch actuator is activated, the bellcrank turns to release the first latch mechanism, and the bellcrank simultaneously turns to release the second latch mechanism; and when the latch actuator is not activated, the bellcrank leaves the first and second latch mechanisms in the latched position.

17. The transport assembly of claim 16,
   wherein the first latch mechanism comprises a first latch pin connected to the distal end of the first latch rod, where the first latch pin is biased to remain in the latched position; and the second latch mechanism comprises a second latch pin connected to the distal end of the second latch rod, where the second latch pin is biased to remain in the latched position;
   wherein when the latch actuator is activated, the bellcrank turns to pull the first latch rod to cause the first latch pin to move from the latched position to release the first latch mechanism, and the bellcrank simultaneously turns to pull the second latch rod to cause the second latch pin to move from the latched position to release the second latch mechanism.

18. The transport assembly of claim 17, wherein first head connector arm has a first striker plate and the second head connector arm has a second striker plate;
   wherein the first latch pin has an upper striker face with a slope that slopes from a higher side to a lower side, and the second latch pin has an upper striker face with a slope that slopes from a higher side to a lower side;
   wherein, when the harvesting head is lowered to transition to working mode, the first striker plate of the first head connector arm lowers onto the upper striker face of the first latch pin and slides down the slope of the upper striker face of the first latch pin which causes the first latch pin to move from the latched position, and simultaneously the second striker plate of the second head connector arm lowers onto the upper striker face of the second latch pin and slides down the slope of the upper striker face of the second latch pin which causes the second latch pin to move from the latched position, and when the first striker plate of the first head connector arm lowers below the first latch pin then the first latch pin returns to the latched position and latches the first head connector arm to the transport axle, and when the second striker plate of the second head connector arm lowers below the second latch pin then the second latch pin returns to the latched position and latches the second head connector arm to the transport axle.

19. The transport assembly of claim 18,
   wherein the first latch mechanism further comprises a first latch guide and a first retractor, where the first latch guide is fixedly attached to the transport axle and the first latch pin is configured to move horizontally through the first latch guide; and where the first retractor attaches the first latch pin to the distal end of the first latch rod;

wherein the second latch mechanism further comprises a second latch guide and a second retractor, where the second latch guide is fixedly attached to the transport axle and the second latch pin is configured to move horizontally through the second latch guide; and where the second retractor attaches the second latch pin to the distal end of the second latch rod;

wherein when the latch actuator is activated, the bellcrank turns to pull the first retractor to cause the first latch pin to move horizontally through the first latch guide to release the first latch mechanism, and the bellcrank simultaneously turns to pull the second retractor to cause the second latch pin to move horizontally through the second latch guide to release the second latch mechanism.

20. The transport assembly of claim 1, wherein the latch actuator is configured to be manually activated, and the first and second latch mechanisms are biased to remain in a latched position;

wherein when the latch actuator is activated the first and second latch mechanisms simultaneously move to an unlatched position; and when the latch actuator is not activated the first and second latch mechanisms remain in a latched position.

* * * * *